(12) United States Patent
Horiguchi et al.

(10) Patent No.: US 6,969,484 B2
(45) Date of Patent: Nov. 29, 2005

(54) MANUFACTURING METHOD AND DEVICE FOR ELECTRET PROCESSED PRODUCT

(75) Inventors: Hiroyoshi Horiguchi, Shiga-ken (JP); Masaaki Takeda, Muko (JP)

(73) Assignee: Toray Industries, Inc., Tokyo (JP)

( * ) Notice: Subject to any disclaimer, the term of this patent is extended or adjusted under 35 U.S.C. 154(b) by 396 days.

(21) Appl. No.: 10/399,681

(22) PCT Filed: Jun. 6, 2002

(86) PCT No.: PCT/JP02/05691

§ 371 (c)(1),
(2), (4) Date: Apr. 21, 2003

(87) PCT Pub. No.: WO03/006735

PCT Pub. Date: Jan. 23, 2003

(65) Prior Publication Data

US 2004/0023577 A1     Feb. 5, 2004

(30) Foreign Application Priority Data

Jun. 18, 2001   (JP) .............................. 2001-183839

(51) Int. Cl.⁷ .......................... D01D 5/26; D04H 1/70; D06B 3/10
(52) U.S. Cl. ...................... 264/518; 264/101; 264/103; 264/211.14; 264/340; 264/345; 425/72.2; 425/83.1; 425/377; 425/378.1; 425/404; 425/445
(58) Field of Search ............................... 264/101, 103, 264/211.14, 340, 345, 436, 518; 425/72.2, 425/83.1, 377, 378.1, 404, 445

(56) References Cited

FOREIGN PATENT DOCUMENTS

| JP | 57-014467 B2 | 3/1982 |
|----|--------------|--------|
| JP | 61-102476 A1 | 5/1986 |
| JP | 06-182128 A1 | 7/1994 |
| WO | 95-05501 A2 | 2/1995 |
| WO | WO 97/07272 A1 | 2/1997 |
| WO | WO 00/01737 A1 | 1/2000 |
| WO | WO 00/13765 A1 | 3/2000 |
| WO | WO 01/26778 A1 | 4/2001 |
| WO | WO 01/27371 A1 | 4/2001 |
| WO | WO 01/27381 A1 | 4/2001 |

OTHER PUBLICATIONS

International Search Report for PCT/JP02/05691 mailed on Sept. 24, 2002.

*Primary Examiner*—Leo B. Tentoni
(74) *Attorney, Agent, or Firm*—Rader, Fishman & Grauer PLLC

(57) ABSTRACT

A manufacturing method of an electret processed product, comprising the steps of allowing a section nozzle (22) to come into contact with a nonconductive fiber sheet (S) so as to cross in the lateral direction of the sheet while running the sheet, allowing the surface of the sheet on the opposite side of the contact portion to come into contact with or to immerse into a water surface, sucking water from the suction nozzle (22) so that the water can be passed through the sheet in the thickness direction of the sheet to penetrate the water into the nonconductive fiber sheet (S), and drying the nonconductive fiber sheet (S), whereby a high quality and high performance electret processed product can be manufactured at a low cost.

19 Claims, 3 Drawing Sheets

MANUFACTURING METHOD AND DEVICE FOR ELECTRET PROCESSED PRODUCT

BACKGROUND OF THE INVENTION

1. Field of the Invention

The present invention relates to the manufacturing method and device for an electret processed product, and in particular relates to the manufacturing method and device for an electret processed product enabling a high quality electret processed product to be produced at a low cost.

2. Detailed Description of the Prior Art

Conventionally, an electret processed fiber sheet has been used as an air filter material having an excellent performance with a low pressure loss. As manufacturing methods for the electret processed fiber sheet, a method for electret processing by means of corona discharge generated by applying a high voltage to a fiber sheet including a synthetic fiber nonwoven fabric and the like (refer to Japanese Patent Laid-Open No. 1986-102476 and so on), and a method for also electret processing by means of the same corona discharge generated by applying a high voltage using wire electrodes to a film sheet, thereby making the film sheet into a nonwoven fabric (refer to Japanese Patent Laid-Open No. 1982-14467 and so on) are known.

However, since the method for electret processing by means of corona discharge is performed by means of corona discharge generated by applying a high voltage from a needle shape or wire electrode to the surface thereof, by placing on an earth electrode or while running it, unevenness tends to occur due to the distance accuracy and the like between a high voltage applying electrode and the earth electrode, thereby resulting in problems like uneven charging of the electret processed sheet and damage of the sheet due to spark discharge.

Further, there has also been a problem of high costs because high voltage units are generally priced high and expenses are required for the safe operation and maintenance thereof.

SUMMARY OF THE INVENTION

The object of the present invention is to solve problems of the prior art and provide a manufacturing method and device for an electret processed product enabling a high quality and high performance electret processed product to be manufactured at a low cost.

The manufacturing method of an electret processed product according to the present invention to solve the above subject is characterized by the steps of:

allowing a suction nozzle to come into contact with a nonconductive fiber sheet so as to cross in the lateral direction of the sheet while running the sheet;

allowing the surface of the sheet on the opposite side of the contact portion to come into contact with or to immerse into a water surface;

sucking water from the suction nozzle so that the water can be passed through the sheet in the thickness direction of the sheet to penetrate the water into the nonconductive fiber sheet; and drying the nonconductive fiber sheet.

Like this, by allowing the suction nozzle to come into contact with the nonconductive fiber sheet while running the sheet, allowing the surface of the sheet on the opposite side of the contact portion to come into contact with or to immerse into a water surface, and by sucking water from the suction nozzle, the water can be passed through the sheet in the thickness direction of the sheet and thus penetrated into an entire of the thickness direction inside the sheet. Moreover, since the suction nozzle is arranged to cross in the lateral direction of the sheet and sucking is performed while running the sheet, the above penetrating action of water in an entire of the thickness direction of the sheet is spread uniformly over a whole surface of the sheet. Therefore, by drying the sheet, an electret processed sheet, charged uniformly and in the high density, can be obtained.

Moreover, since the penetrating action requires a local sucking operation of water at only a point where the suction nozzle comes in contact with the nonconductive fiber sheet, thereby being attained using a small water bath without need for a large water bath. Therefore, the manufacturing device can be made as compact as possible. Since no conventional high voltage generation unit is required, the manufacturing device can be realized both safe and low cost.

Also, the device for manufacturing an electret processed product according to the present invention comprises in a continuous arrangement:

papermaking means for manufacturing a nonconductive fiber sheet;

water penetrating means, corresponding to a nonconductive fiber sheet, for allowing a suction nozzle to come into contact with the nonconductive fiber sheet so as to cross in the lateral direction of the sheet, allowing the surface of the sheet on the opposite side of the contact portion to come into contact with or to immerse into a water surface, and sucking water from the suction nozzle; and drying means for drying the nonconductive fiber sheet, and can manufacture an electret processed product of a compact structure, high quality and high performance.

DETAILED DESCRIPTION OF THE PREFERRED EMBODIMENT

Figure 1:
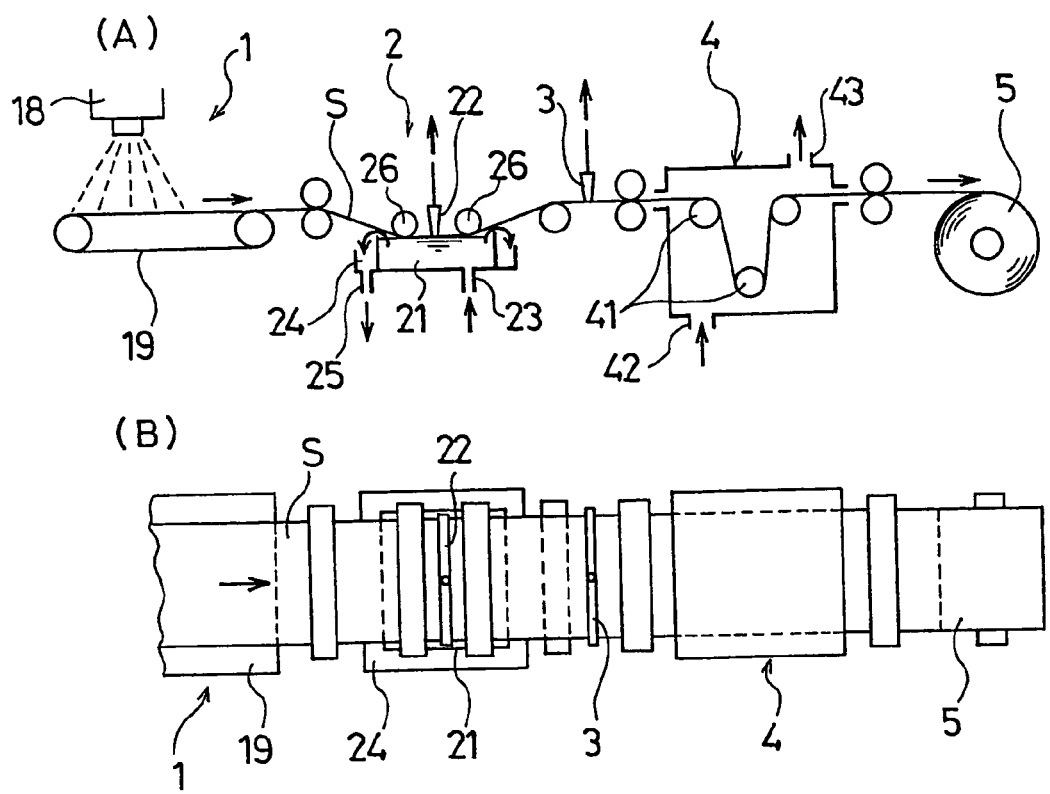
FIGS. 1(A), (B) are a schematic side view and a plan view showing the manufacturing process of an electret processed product according to the present invention.

The nonconductive fiber sheet used for the present invention is not particularly limited only to the above, in which it may be a sheet made of nonconductive fiber material. For example, a fiber sheet like a woven fabric, a knitted fabric, a nonwoven fabric or the like made of synthetic fiber or natural fiber can be mentioned. Of these, particularly a synthetic fiber sheet is preferable, and particularly a melt blown nonwoven fabric and a spunbonded nonwoven fabric are preferable. Also, when used for an air filter, a synthetic fiber nonwoven fabric is preferable, and particularly when used for a high performance filter, the melt blown nonwoven fabric is preferable.

Also, the nonconductive fiber sheet used for the present invention can also be a sheet made of plastic film fibrillated into fiber. The material of the nonconductive fiber sheet is not particularly limited, in which it may be a material having a nonconductivity. Preferably, a sheet using mainly a material with a volume resistivity of $10^{12}$ Ωcm or more, and more preferably $10^{14}$ Ωcm or more may be used.

For example, polyolefin, such as polyethylene, polypropylene and the like, polyester, such as polyethylene terephthalate, polylactic acid and the like, polycarbonate, polystyrene, polyphenylenesulfate, a fluorine-based resin, and their mixtures can be mentioned. Of these, materials using mainly polyolefin or polylactic acid are preferable from the electret performance viewpoint. Further, for polyolefin, materials using mainly polypropylene are more preferable.

For the nonconductive fiber sheet used for the present invention, it is preferable to blend at least one of a hindered amine-based additive or a triazine additive. This is because containing the additive in the nonconductive fiber sheet will make it possible to maintain a particularly high electret performance.

As a hindered amine-based additive, out of the above two types of additives, poly[((6-(1,1,3,3-tetramethylbutyl)imino-1,3,5-triazine-2,4-diyl)((2,2,6,6,tetramethyl-4-piperidyl)imino)hexamethylene((2,2,6,6,-tetramethyl-4-piperidyl)imino))(Ciba-Geigy,CHIMASSORB 944LD), dimethylsuccinate-1-(2-hydroxyethyl)-4-hydroxy-2,2,6,6-tetramethylpiperidinepolycondensate(Ciba-Geigy, TINUVIN62 2LD),2-(3,5-4-di-t-butyl-4-hydroxybenzyl)-2-n-butyl malonic acid bis (1,2,2,6,6-pentamethyl-4-piperidyl) (Ciba-Geigy,TINUVIN144) and so on can be mentioned.

Also, as a triazine additive, poly [((6-(1,1,3,3-tetramethylbutyl) imino-1,3,5-triazine-2,4-diyl)((2,2,6,6,tetramethyl-4-piperidyl)imino) hexamethylene((2,2,6,6,-tetramethyl-4-piperidyl)imino)) (Ciba-Geigy, CHIMASSORB944LD) mentioned above, 2-(4,6-diphenyl-1,3,5-triazine-2-yl)-5-((hexyl) oxy)-phenol(Ciba-Geigy, TINUVIN1577FF) and so on can be mentioned. Of these, particularly the use of a hindered amine-based additive is preferable.

For the nonconductive fiber sheet, besides the above additive, a publicly known additive generally used with the nonconductive fiber sheet of an electret processed product, such as a heat stabilizer, a weatherability agent, and a polymerization inhibitor may also be used.

The adding amount of the above hindered amine-based additive or triazine additive is not particularly limited, but preferably the adding amount may be within a range of 0.5 to 5% by weight, and more preferably within a range of 0.7 to 3% by weight. If the adding amount is below 0.5% by weight, it is not easy to secure the intended high-level electret performance. Also, an extreme blending as to exceed 5% by weight is not preferable because it degrades the papermaking performance and film production performance and is disadvantageous in cost.

The manufacturing method of an electret processed product according to the present invention allows a suction nozzle to come into contact with a nonconductive fiber sheet so as to cross in the lateral direction of the sheet while running the sheet, and by allowing the surface of the sheet on the opposite side of the contact portion to come into contact with or to immerse into a water surface, sucks water from the suction nozzle under the condition. When water is sucked from the suction nozzle, since the water on the opposite side of the part where the suction nozzle is in contact with the sheet is passed through the sheet in the thickness direction of the sheet, the water can be penetrated into an entire of the thickness direction inside the sheet. Moreover, since the suction nozzle is arranged to cross in the lateral direction of the sheet and sucking is performed while running the sheet, the above penetrating action of water in an entire of the thickness direction of the sheet is spread uniformly over a whole surface of the sheet. Therefore, by drying the sheet, an electret processed sheet, charged uniformly and in the high density, can be obtained.

By the penetrating action using the suction nozzle, the permeability of water to nonconductive fiber sheet can made 500% or more. Also, as an upper limit of the permeability, the penetration increased up to about 1500%.

Here, the permeability of water to nonconductive fiber sheet refers to a permeability defined by the formula below.

$$P(\%)=[(Wo-W)/W]\times 100$$

Where,
P: Permeability
Wo: Weight of sheet with penetrated water (g/m$^2$)
W: Specific weight per unit of sheet (g/m$^2$)

Also, since the above penetrating action of water to the nonconductive fiber sheet is required locally for only a part where the suction nozzle comes in contact with the sheet, a water bath for supplying water can be small in capacity, and no large water bath is necessary. Therefore, the manufacturing device can be made as compact as possible.

As the suction nozzle according to the present invention, preferably the suction port is formed into a slit-shape. The slit width of the slit-shape suction port preferably be within a range of 0.1 to 5 mm, and more preferably within a range of 0.3 to 2 mm and still more preferably within a range of 0.3 to 1.5 mm. Since water can be penetrated with a uniform density into the entire sheet, even for a large width nonconductive fiber sheet, by using a slit-shape suction nozzle with such a slit width. The pressure loss is low and the collecting performance is high, and a good quality electret processed product free of surface fluffing can be obtained.

When the slit width is smaller than 0.1 mm, the suction resistance is increased and the machining accuracy of processing the slit width is lowered, making it difficult to penetrate water with a uniform density. Moreover, if the slit width is larger than 5 mm, not only penetrating water uniformly in the lateral direction of the nonconductive fiber sheet, but also the suction force is lowered. Thus there is a disadvantage that the suction pump requires a large size. Also, since the slit width is large, the nonconductive sheet as well as the sucked water is sucked, making stable processing difficult.

Arrangement of the suction nozzle to the nonconductive fiber sheet is not limited when the arrangement allows crossing in the lateral direction of the sheet, but preferably the suction nozzle be orthogonal to the running direction (longitudinal direction) in that the suction nozzle can be reduced in length. More preferably, to allow the sucking action to be done faster in a center part in the lateral direction of the sheet than in both flange positions, a suction slit with a shape bent in a convex shape be arranged. By applying a composition like this, there will be no wrinkles and a processing uniform in the lateral direction can be realized.

As a method to further improve the permeability of water to the nonconductive fiber sheet of the present invention, interposing a dewatering process between the penetration process and the drying process, both the penetration process and dewatering process may be repeated twice or more. By performing the drying process after repeating the penetration process and dewatering process twice or more, the permeability at a final penetration process is improved, and a high quality electret processed sheet charged more densely and uniformly can be obtained.

The dewatering means is not particularly limited; for example, the dewatering means can be applied by suction sucking and the like using a nip roller, a suction roller, a suction nozzle or the like. The dewatering process, when performed twice or more alternately with the penetration process as above, will not only improve the penetration effect of water to the nonconductive fiber sheet in the final penetration process but also useful for improving the drying efficiency in the drying process to follow.

The method for drying the nonconductive fiber sheet can use either of the conventionally known drying methods. For example, the hot air drying method, the vacuum drying method, the natural drying method and the like can be applied. Particularly, the hot air drying method is preferable because it enables continuous processing. When employing the hot air drying method, the drying temperature should be set for a temperature not deactivating electret.

Drying of the nonconductive fiber sheet is done till the moisture contained in the nonconductive fiber sheet reaches the official regain. The drying temperature preferably be 130° C. or less, more preferably 120° C. or less, and still more preferably 100° C. or less. The dried sheet may promptly be discharged from the drier so as not to deactivate the electret effect; for example, at a drying temperature of 100° C. or more, the dried sheet may be discharged within 30 minutes.

As the water used for the penetration processing to the nonconductive fiber sheet according to the present invention, fresh water, as practical, removed soil using a liquid filter and the like may be used. Particularly, pure water, such as demineralized water, distilled water, filtered water passed through a reverse osmosis membrane and the like is preferable. Also, the level of pure water preferably be $10^3$ $\mu S/m$ or less by electrical conductivity, more preferably $10^2$ $\mu S/m$ or less.

Also, the above water can be further improved of the penetration performance of water to the nonconductive fiber sheet by mixing a water soluble organic solvent. In this case, as the concentration of the water soluble organic solvent, normally 20% by weight or less is used. As the water soluble organic solvent mixed with water, an organic solvent with boiling point lower than the boiling point of water is preferable. That is, since the water soluble organic solvent is used to improve the penetration performance of water to the sheet, after being penetrated into the sheet, preferably the water soluble organic solvent vaporized and dried as soon as possible. More preferably, the difference in boiling point from water may be lower by 10° C. or more.

The type of the water soluble organic solvent is not particularly limited when the penetration performance of the mixed solution to the nonconductive fiber sheet is favorable. For example, alcohols, including methyl alcohol, ethyl alcohol, isopropyl alcohol and the like, ketones, including acetone, methyl ethyl ketone and the like, esters, including propyl acetate, butyl acetate and the like, and aldehydes, carboxylic acids and the like can be mentioned. Particularly, alcohols and ketones are preferable from the penetration performance viewpoint, and preferably at least one kind of acetone, isopropyl alcohol and ethanol be used. More preferably, a water soluble organic solvent using mainly isopropyl alcohol may be used.

FIGS. 1(A), (B) illustrate a case of implementing the manufacturing process of the electret processed product according to the present invention in a continuous process from papermaking of a nonconductive fiber sheet to processing of an electret processed sheet.

In FIGS. 1(A), (B), a reference numeral 1 is a papermaking unit for manufacturing a nonconductive fiber sheet S, 2 is a penetration unit for penetrating water into the nonconductive fiber sheet S, and 3 is a suction nozzle for dewatering for suction sucking an excess water, and 4 is a drying equipment.

The papermaking unit 1 is composed to have a melt blow spinning machine 18 for spinning out melted polymer from a spinning hole into super fine short fibers together with a jet flow of compressional heating air, and provide for a net conveyer 19, below the melt blow spinning machine 18, for collecting the fiber spun out from the melt blow spinning machine 18 as a sheet shaped nonconductive fiber sheet S.

The penetration unit 2 following the downstream of the papermaking unit 1 is equipped with a water bath 21 and a suction nozzle 22. As the suction nozzle 22, a suction nozzle with a suction port formed in a slit shape is preferable. To the water bath 21 is supplied water for penetration from a supply pipe 23, and after being stored temporarily in the water bath 21, the water flows over an upper brim into an overflow bath 24 and is discharged from a discharge pipe 25. The discharged water may be reused, or needless to say generally called the liquid level control system for supplying only a portion taken by the sheet may also be adopted.

The nonconductive fiber sheet S supplied continuously from the papermaking unit 1 is run while keeping one face (lower face) in contact with a water surface of the water bath 21 by guide rollers 26, 26, and on the upper face side of the nonconductive fiber sheet S that comes into contact with the water surface is the suction nozzle 22 in contact.

The suction nozzle 22 is connected with a suction pump, not illustrated in the drawings, and is in contact with the nonconductive fiber sheet S so as to cross in the lateral direction. This way the suction nozzle 22 in contact with the upper face of the nonconductive fiber sheet S suck up a water in contact with the lower face side of the nonconductive fiber sheet S by a sucking action of the suction pump. Since the water is passed through the sheet in the thickness direction of the sheet, an entire of the thickness direction inside the sheet can be immersed uniformly into water.

Also, since the suction nozzle 22 crosses the nonconductive fiber sheet S in the lateral direction and the nonconductive fiber sheet S runs in the longitudinal direction, the penetrating action in the thickness direction of the sheet can be performed all over the sheet surface. As a shape of crossing by the suction nozzle 22, besides a linear shape of crossing as illustrated, the shape of crossing may be a tilted needle shape having a convex at a center part on the upstream side, a bow shape or an arc shape. Also, as the suction nozzle 22, a suction nozzle with a slit-shape suction port is used, and as for the slit width, 0.1 to 5 mm is preferable, more preferably 0.3 to 2 mm, and most preferably within a range of 0.3 to 1.5 mm.

The nonconductive fiber sheet S with water under a penetrated condition, after being previously squeezed up excess water by the sucking action of the suction nozzle 3, is transferred to the drying equipment 4. In the drying equipment 4 are provided a plurality of guide rollers 41 in a zigzag shape, and the inside is under a heated condition by the heated air supplied from a supply port 42 and discharged from a discharge outlet 43. Therefore, the nonconductive fiber sheet S transferred to the drying equipment 4 is dried while running zigzag through guide rollers 41, discharged as an electret processed sheet and becomes a roll wound electret processed sheet 5.

The penetrating action of water by the suction nozzle 22 is acceptable when actions are performed to allow the suction nozzle 22 to come into contact with one face of the nonconductive fiber sheet S, and by allowing the surface of the sheet on the opposite side to come into contact with or to immerse into water, the water sucked from the suction nozzle 22 is passed through the sheet in the thickness direction of the sheet S. The embodiment of FIG. 2 illustrates that the nonconductive sheet S is brought to a condition immersed by distance D from the water surface by pressing down guide rollers 26, 26, and the suction nozzle 22 comes into contact with the upper face of the immersed sheet S. In this case, too, water can be penetrated into the nonconductive fiber sheet S in the thickness direction of the sheet like the case of FIG. 1. However, since the workability of sheet passing is lowered, and the system requires a large size, if the immersion depth D of the nonconductive fiber sheet S from the water surface is made too deep, preferably the distance D is 10 to 500 mm, more preferably 50 to 300 mm.

Figure 3:
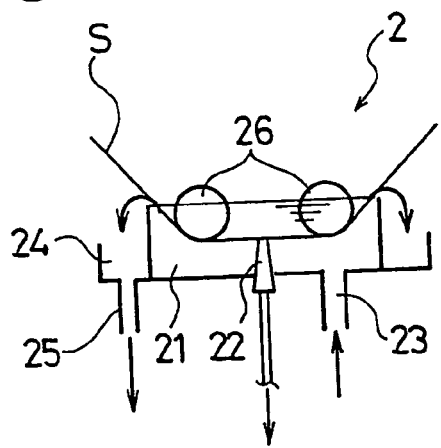
FIG. 3 is a schematic view showing still another embodiment of a penetration unit used for the present invention.

When immersing the nonconductive fiber sheet S into the water surface as described above, the position where the suction nozzle 22 comes into contact may be changed so that the suction nozzle 22 comes into contact from the lower face side of the nonconductive fiber sheet S, as the embodiment of FIG. 3.

Figure 4:
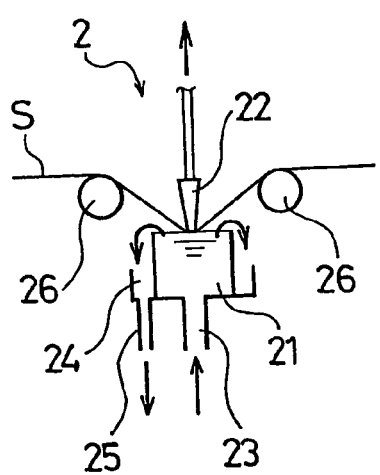
FIG. 4 is a schematic view showing still another embodiment of a penetration unit used for the present invention.

Since the penetrating action of water to the nonconductive fiber sheet S is localized to only a part the suction nozzle 22 comes into contact according to the present invention, the distance for the nonconductive fiber sheet S to come into contact with the water surface, or the distance the nonconductive fiber sheet S immersed into the water surface does not necessarily need to secure a certain distance by using guide rollers 26, 26. Therefore, as the embodiment of FIG. 4, the distance for bringing the nonconductive fiber sheet S into contact with the water surface may be limited to a part corresponding to the slit width for the suction nozzle 22 to come into contact. By reducing the contact distance of the nonconductive fiber sheet S to the water surface like this, the water bath 21 in the penetration unit 2 can be made more compact. Of course, the part of the nonconductive fiber sheet S to which the suction nozzle 22 comes into contact may also be immersed into the water surface as shown in FIG. 5.

Figure 5:
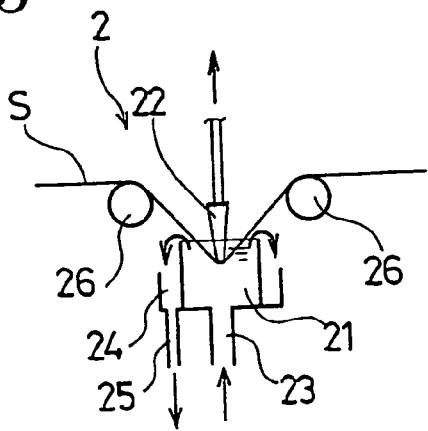
FIG. 5 is a schematic view showing still another embodiment of a penetration unit used for the present invention.

When the nonconductive fiber sheet S is immersed from the water surface as shown in FIG. 3 and FIG. 5, like the case of FIG. 2, the immersion depth D is 10 to 500 mm, more preferably 50 to 300 mm.

According to the present invention as described above, by allowing the suction nozzle to come into contact with the nonconductive fiber sheet while running the sheet, allowing the surface of the sheet on the opposite side of the contact portion to come into contact with or to immerse into a water surface, and by sucking water from the suction nozzle, the water can be passed through the sheet in the thickness direction of the sheet and penetrated into an entire of the thickness direction inside the sheet. And yet, since the suction nozzle is arranged to cross in the lateral direction of the sheet and sucking is performed while running the sheet, the above penetrating action of water in an entire of the thickness direction of the sheet is spread uniformly over a whole surface of the sheet. Therefore, by drying the sheet, an electret processed sheet, charged uniformly and in the high density, can be obtained.

Also, since the penetrating action requires a local sucking operation of water at only a point where the suction nozzle comes in contact with the nonconductive fiber sheet, the penetrating action can be attained using a small water bath, without need for a large water bath. Therefore, the manufacturing device can be made as compact as possible, and since no conventional high voltage generation unit is required, the manufacturing device can be realized both safe and low cost.

Also, since water is sucked in the manufacturing method of the present invention, a physical impact given to the fiber sheet is small compared to a method to blow water, and there is almost no spoiling of quality of the fiber sheet, for example, by fluffing, so that physical properties of the fiber sheet can be maximized, as are. This is quite favorable when using the electret processed fiber sheet obtained by the manufacturing method of the present invention as a filter base and the like.

Characteristic values used in the embodiments described below were measured by the following measurement methods.

[Collecting Performance]

Figure 6:
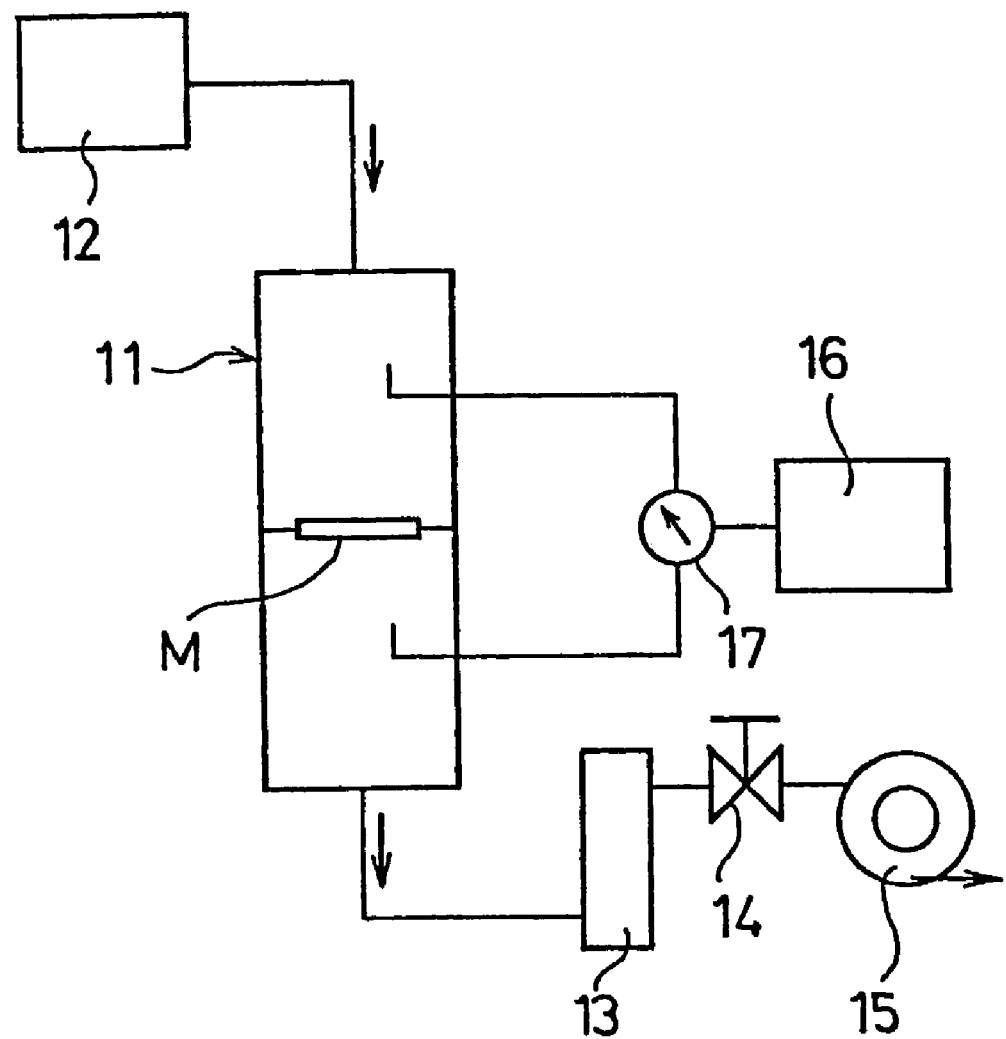
FIG. 6 is a schematic view showing a collecting performance measuring unit used with the embodiments of the present invention.

Measurements were done using a collecting performance measuring unit shown in FIG. 6. The collecting performance measuring unit connects a dust container box 12 on the upstream side of a sample holder 11 for setting a measured sample M, and a flowmeter 13, a flow regulating valve 14 and a blower 15 on the downstream side thereof. Also, a particle counter 16 is provided in the sample holder 11, and using the particle counter 16, and by way of a switch cock 17, dust numbers on the upstream and downstream sides of the measured sample M can be measured respectively.

When measuring the collecting performance, polystyrene standard latex powder of 0.3 $\mu$m in diameter is charged in the dust container box 12, the sample M is set to the holder 11 and the air quantity is adjusted by the flow regulating valve 14 so as the filter passage speed is 1.5 m/min, the dust concentration is stabilized within a range of 10,000 to 40,000 particles/$2.83 \times 10^{-4}$ m$^3$ (0.01 ft$^3$), and after measuring dust numbers n on the upstream and downstream sides of the sample M five times by the particle counter 16, (RION Co.,Ltd, KC-01B), the collecting performance (%) is determined by the following calculation formula based on JIS K-0901:

Collecting performance(%)=[1−(n/N)]×100

Where,
n: Dust number on the downstream side
N: Dust number on the upstream side

[Mean Fiber Diameter]

100 fibers or more magnified by SEM photo were measured for diameter, and the average was determined.

Embodiment 1

Figure 2:
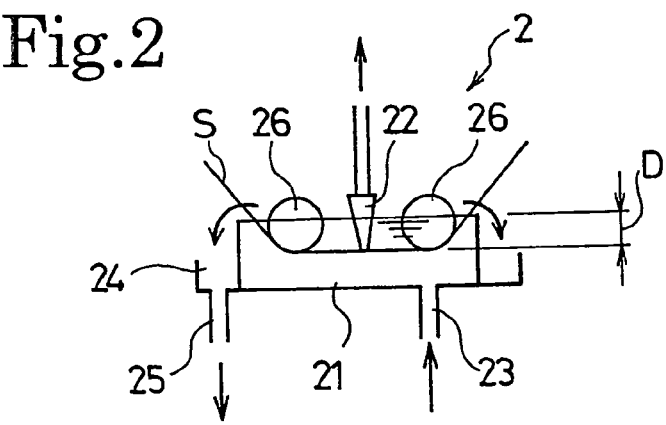
FIG. 2 is a schematic view showing another embodiment of a penetration unit used for the present invention.

Using a continuous manufacturing unit of FIG. 1, and using as raw material MI=700 polypropylene containing 1% of triazine additive (Ciba-Geigy, CHIMASSORB 944) as weatherability agent, a melt blown nonwoven fabric of 40 g/m$^2$ by a specific weight per unit and an average fiber diameter of 2.0 $\mu$m is manufactured, and then supplied to a penetration unit to which pure water is supplied, allowing one face to come into contact with a water surface, and allowing a suction nozzle to come into contact with the upper face to penetrate water by sucking, and finally dried by a drying equipment, thereby an electret melt blown nonwoven fabric is manufactured.

The measured collecting performance of the obtained electret melt blown nonwoven fabric was 99.99%.

Comparative Example 1

Using the same melt blown nonwoven fabric as that used in Embodiment 1, the nonwoven fabric is subject to immersion for one minute in pure water, cut water and dried. The measured collecting performance of the processed nonwoven fabric was 59.7%, which was markedly low compared to the electret melt blown nonwoven fabric of Embodiment 1.

Comparative Example 2

The collecting performance of the same melt blown nonwoven fabric as that of Embodiment 1 was measured, applying no penetration and drying, and the result was low as 57.5%.

Embodiment 2

A system similar to that used in Embodiment 1 is used, and the immersion depth D is set to 200 mm. Also, using as raw material MI=900 polypropylene containing 1% of triazine additive (Ciba-Geigy, CHIMASSORB944) as weatherability agent, a melt blown nonwoven fabric of 40 gm$^2$ by a specific weight per unit and an average fiber diameter of 2.2 μm is manufactured using a melt blown method, and then supplied to a penetration unit to which pure water is supplied, allowing water to penetrate by sucking by a suction nozzle (slit width: 0.5 mm) under a condition immersed in water, and finally dried by a drying equipment after being dewatered, thereby an electret melt blown nonwoven fabric is manufactured.

The measured collecting performance of the obtained electret melt blown nonwoven fabric showed a high performance of 99.999%.

Embodiment 3

Except that the raw material is polylactic acid (number average molecular weight: 66,100, weight average molecular weight: 120,000), a melt blown nonwoven fabric of 40 g/m$^2$ by a specific weight per unit and an average fiber diameter of 3.5 μm is manufactured using the melt blown method according to embodiment 2, and then processed by a penetration unit and a drying equipment, thereby an electret melt blown nonwoven fabric is manufactured.

The measured collecting performance of the obtained electret melt blown nonwoven fabric showed a high performance of 99.99%.

The present invention is applicable to an industrial field manufacturing an electret processed product by electret processing a synthetic fiber sheet, including a nonwoven fabric and the like. The electret processed product displays a high performance particularly when used in the filter field.

What is claimed is:

1. The manufacturing method of an electret processed product, comprising the steps of:
   allowing a suction nozzle to come into contact with a nonconductive fiber sheet so as to cross in the lateral direction of the sheet while running the sheet;
   allowing the surface of the sheet on the opposite side of the contact portion to come into contact with or to immerse into a water surface;
   sucking water from the suction nozzle so that the water can be passed through the sheet in the thickness direction of the sheet to penetrate the water into the nonconductive fiber sheet; and
   drying the nonconductive fiber sheet.

2. The manufacturing method of an electret processed product as claimed in claim 1, wherein a dewatering process is interposed between said penetration process and drying process.

3. The manufacturing method of an electret processed product as claimed in claim 2, wherein said penetration process and dewatering process are repeated at least twice.

4. The manufacturing method of an electret processed product as claimed in claim 1, 2 or 3, wherein the permeability of water to said nonconductive fiber sheet by said penetration process is 500% or more.

5. The manufacturing method of an electret processed product as claimed in claim 1, 2, or 3, wherein a suction port of said suction nozzle is in a slit-shape.

6. The manufacturing method of an electret processed product as claimed in claim 1, 2 or 3, wherein said nonconductive fiber sheet contains a hindered amine-based additive or triazine additive by 0.5 to 5% by weight.

7. The manufacturing method of an electret processed product as claimed in claim 1, 2 or 3, wherein said nonconductive fiber sheet is made of synthetic fibers.

8. The manufacturing method of an electret processed product as claimed in claim 7, wherein said sheet made of synthetic fibers is melt blown nonwoven fabric.

9. The manufacturing method of an electret processed product as claimed in claim 7, wherein said sheet made of synthetic fibers is spunbonded nonwoven fabric.

10. The manufacturing method of an electret processed product as claimed in claim 7, wherein said nonconductive fiber sheet is composed mainly of polyolefin.

11. The manufacturing method of an electret processed product as claimed in claim 7, wherein said polyolefin is composed mainly of polypropylene.

12. The manufacturing method of an electret processed product as claimed in claim 7, wherein said nonconductive fiber sheet is composed mainly of polylactic acid.

13. The manufacturing method of an electret processed product as claimed in claim 1, 2 or 3, wherein said water is demineralized water, distilled water or filtered water by a reverse osmosis membrane.

14. The manufacturing method of an electret processed product as claimed in claim 1, 2 or 3, wherein said water contains a water soluble organic solvent.

15. The manufacturing method of an electret processed product as claimed in claim 14, wherein said water soluble organic solvent has a boiling point lower than that of water.

16. The manufacturing method of an electret processed product as claimed in claim 14, wherein said water soluble organic solvent contains mainly alcohols or ketones.

17. The manufacturing method of an electret processed product as claimed in claim 16, wherein said water soluble organic solvent is at least one kind of isopropyl alcohol, ethyl alcohol and acetone.

18. A device for manufacturing an electret processed product, comprising in a continuous arrangement:
   papermaking means for manufacturing a nonconductive fiber sheet;
   a water penetrating means, corresponding to the nonconductive fiber sheet, for allowing a suction nozzle to come into contact with a nonconductive fiber sheet so as to cross in the lateral direction of the sheet, allowing the surface of the sheet on the opposite side of the contact portion to come into contact with or to immerse into a water surface, and sucking water from the suction nozzle; and
   drying means for drying the nonconductive fiber sheet.

19. The device for manufacturing an electret processed product as claimed in claim 18, wherein a suction port of said suction nozzle is in a slit-shape.

* * * * *